United States Patent
An et al.

(10) Patent No.: US 12,403,961 B2
(45) Date of Patent: Sep. 2, 2025

(54) REAR VEHICLE BODY STRUCTURE

(71) Applicants: Hyundai Motor Company, Seoul (KR); Kia Corporation, Seoul (KR)

(72) Inventors: Yong Dok An, Anyang-si (KR); Mun Soo Cha, Suwon-si (KR); MokYeon Hong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 404 days.

(21) Appl. No.: 17/989,403

(22) Filed: Nov. 17, 2022

(65) Prior Publication Data
US 2023/0406416 A1    Dec. 21, 2023

(30) Foreign Application Priority Data

Jun. 16, 2022   (KR) .......................... 10-2022-0073393

(51) Int. Cl.
*B62D 25/20*   (2006.01)
*B62D 25/08*   (2006.01)
(52) U.S. Cl.
CPC ....... *B62D 25/2027* (2013.01); *B62D 25/088* (2013.01)

(58) Field of Classification Search
CPC .......... B60H 1/00428; B60H 2001/002; B62D 25/2027; B62D 25/088
See application file for complete search history.

(56) References Cited

U.S. PATENT DOCUMENTS

| | | | | |
|---|---|---|---|---|
| 4,267,895 A | * | 5/1981 | Eggert, Jr. ............. | B62D 31/00 903/952 |
| 9,623,741 B2 | * | 4/2017 | Honda .............. | H01M 10/6566 |
| 2005/0285563 A1 | * | 12/2005 | Yoneda ................... | B60L 50/64 320/112 |
| 2014/0302362 A1 | * | 10/2014 | Takizawa ............ | H01M 10/625 429/83 |
| 2017/0267065 A1 | * | 9/2017 | Kim ....................... | B60H 1/242 |
| 2017/0341482 A1 | * | 11/2017 | Takezawa ........... | H01M 10/613 |
| 2018/0015806 A1 | * | 1/2018 | Yasuda ................... | B60L 58/26 |
| 2018/0345759 A1 | * | 12/2018 | Okumura ............... | B60K 11/06 |
| 2020/0207423 A1 | * | 7/2020 | Saeki ...................... | B62D 25/20 |
| 2021/0221219 A1 | * | 7/2021 | Watanabe ............ | B60K 11/085 |
| 2021/0291905 A1 | * | 9/2021 | Nakano ............... | H01M 50/244 |

* cited by examiner

*Primary Examiner* — Brian L Swenson
(74) *Attorney, Agent, or Firm* — Slater Matsil, LLP

(57) ABSTRACT

An embodiment rear vehicle body structure includes a rear floor structure coupled to rear side members respectively arranged on both sides of a vehicle body rear portion along a vehicle width direction and a cooling module mounting unit including cooling modules respectively connected to both sides of the vehicle body rear portion, wherein the cooling modules are respectively arranged on both sides of the rear floor structure along the vehicle width direction.

20 Claims, 8 Drawing Sheets

REAR VEHICLE BODY STRUCTURE

CROSS-REFERENCE TO RELATED APPLICATIONS

This application claims the benefit of Korean Patent Application No. 10-2022-0073393, filed on Jun. 16, 2022, which application is hereby incorporated herein by reference.

TECHNICAL FIELD

Exemplary embodiments of the present invention relate to a rear vehicle body structure.

BACKGROUND

In general, eco-friendly vehicles may include, for example, hybrid vehicles, electric vehicles, hybrid electric vehicles, and hydrogen-powered vehicles (also referred to as 'hydrogen electric vehicles' by those skilled in the art).

Among them, various parts such as a high-voltage battery, a fuel cell stack, a driving motor, a hydrogen tank, and a cooling module are mounted in vehicle bodies of hydrogen-powered vehicles. Recently, hydrogen electric vehicle-based passenger vehicles (e.g., sedan type, coupe type, sports car type) have been introduced.

In such a hydrogen electric vehicle-based passenger vehicle, a cooling module is mounted at a front of a vehicle body. However, when an additional cooling module is required for a hydrogen electric vehicle-based passenger vehicle, it may be difficult to install the additional cooling module due to a limited space at the front of the vehicle body.

The above information disclosed in this background section is only for enhancement of understanding of the background of embodiments of the invention, and therefore it may contain information that does not form the prior art that is already known to a person of ordinary skill in the art.

SUMMARY

Exemplary embodiments of the present invention relate to a rear vehicle body structure. Particular embodiments relate to a rear vehicle body structure in which cooling modules are mounted on both sides along a vehicle width direction.

Embodiments of the present invention provide a rear vehicle body structure having an advantage of securing mounting rigidity of a cooling module and body rigidity of a vehicle body rear portion, while securing a space for mounting the cooling module on both sides along a vehicle width direction of the vehicle body rear portion.

An exemplary embodiment of the present invention provides a rear vehicle body structure including a rear floor structure coupled to rear side members respectively arranged on both sides along a vehicle width direction of a vehicle body rear portion, and a cooling module mounting unit in which cooling modules are respectively connected to both sides so that the cooling modules are respectively arranged on both sides along the vehicle width direction of the rear floor structure.

Also, in the rear vehicle body structure according to an exemplary embodiment of the present invention, the rear floor structure may be coupled to a center floor panel provided in a vehicle body middle portion and a front portion of the rear side member.

In addition, in the rear vehicle body structure according to an exemplary embodiment of the present invention, the cooling module mounting unit may include a lower mounting cross member coupled to an upper portion of the rear floor structure along the vehicle width direction and coupled to a lower portion of the cooling module, a partition panel vertically coupled to the lower mounting cross member to partition a vehicle body middle portion and the vehicle body rear portion, and an upper mounting cross member coupled to an upper portion of the partition panel along the vehicle width direction and coupled to an upper portion of the cooling module.

In addition, in the rear vehicle body structure according to an exemplary embodiment of the present invention, the cooling module mounting unit further includes at least one lower mounting bracket coupled to a lower portion of the cooling module and the lower mounting cross member and at least one upper mounting bracket coupled to an upper portion of the cooling module and the upper mounting cross member.

Also, in the rear vehicle body structure according to an exemplary embodiment of the present invention, the partition panel may include a bent portion bent from both sides along the vehicle width direction to a vehicle body middle portion.

Also, in the rear vehicle body structure according to an exemplary embodiment of the present invention, rear side panels respectively provided on both sides of the vehicle body rear portion along the vehicle width direction may be provided.

Also, in the rear vehicle body structure according to an exemplary embodiment of the present invention, an air flow passage connected to the cooling module may be formed between the bent portion and the rear side panel.

Also, in the rear vehicle body structure according to an exemplary embodiment of the present invention, an air inlet hole connected to the air flow passage may be formed in the rear side panel.

In addition, in the rear vehicle body structure according to an exemplary embodiment of the present invention, the cooling module mounting unit may further include at least one mounting reinforcing member coupled to the lower mounting cross member, the upper mounting cross member, and the partition panel in an up-down vertical direction.

Also, in the rear vehicle body structure according to an exemplary embodiment of the present invention, a rear shock absorber upper reinforcing member may be coupled to the rear side member.

In addition, in the rear vehicle body structure according to an exemplary embodiment of the present invention, an upper portion of the rear shock absorber upper reinforcing member may be coupled to the upper mounting cross member along a front-rear direction of the vehicle body through a connecting member.

Also, in the rear vehicle body structure according to an exemplary embodiment of the present invention, the rear floor structure may include a dome-shaped rear floor panel coupled to a lower portion of the partition panel and the lower mounting cross member.

Also, in the rear vehicle body structure according to an exemplary embodiment of the present invention, a battery may be disposed below the rear floor panel.

Also, in the rear vehicle body structure according to an exemplary embodiment of the present invention, a hydrogen tank may be mounted on the upper mounting cross member.

According to the exemplary embodiments of the present invention, by mounting the cooling module on both sides along the vehicle width direction, the cooling performance of heat-generating parts mounted on the hydrogen electric vehicle-based passenger vehicle may be further improved.

In addition, according to the exemplary embodiments of the present invention, the connectivity of the cooling module to the vehicle body may be strengthened, rigidity of mounting may be secured, and structural rigidity of the vehicle body rear portion may be secured.

In addition, the effects obtainable or predicted by the exemplary embodiments of the present invention are to be disclosed directly or implicitly in the detailed description of the exemplary embodiments of the present invention. That is, various effects predicted according to exemplary embodiments of the present invention will be disclosed in the detailed description given later.

BRIEF DESCRIPTION OF THE DRAWINGS

Exemplary embodiments herein may be better understood by referring to the following description in connection with the accompanying drawings in which like reference numerals refer to identical or functionally similar elements.

Figure 1:
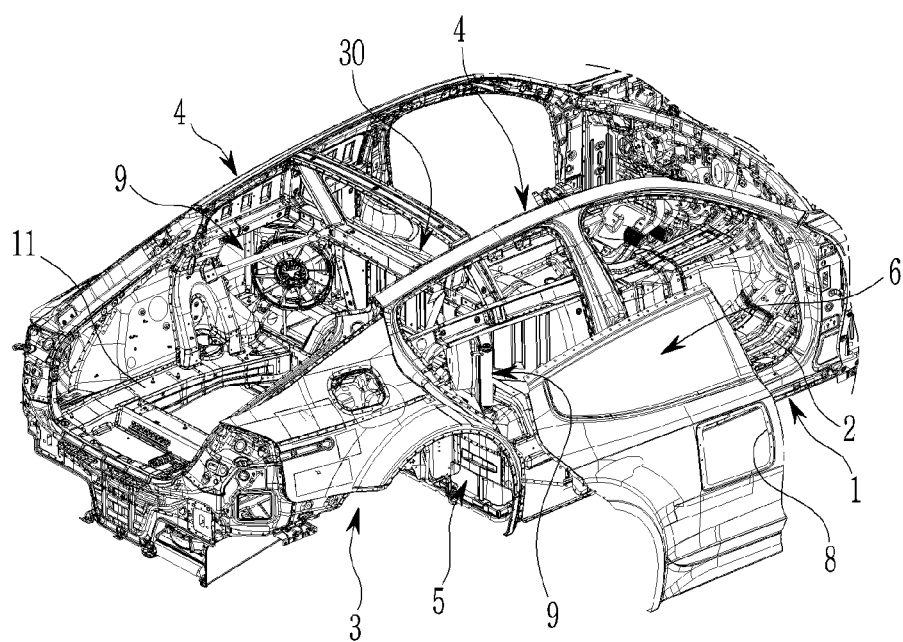
FIGS. 1 to 4 are perspective views illustrating a rear vehicle body structure according to an exemplary embodiment of the present invention.

It is to be understood that the drawings referenced above are not necessarily drawn to scale, but rather present a rather simplified representation of various preferred features illustrating the basic principles of embodiments of the present invention. Certain design features of embodiments of the present invention, including, for example, particular dimensions, orientation, location, and shape, will be determined in part by the particular intended application and environment of use.

The following reference identifiers may be used in connection with the accompanying drawings to describe exemplary embodiments of the present disclosure.

| | |
|---|---|
| 1: vehicle body middle portion | 2: center floor panel |
| 3: vehicle body rear portion | 4: side structure |
| 5: battery | 6: rear side panel |
| 7: hydrogen tank | 8: air inlet hole |
| 9: cooling module | 11: rear side member |
| 20: rear floor structure | 21: rear floor panel |
| 30: cooling module mounting unit | 31: lower mounting cross member |
| 35: partition panel | 37: bent portion |
| 39: air flow passage | 41: upper mounting cross member |
| 45: mounting reinforcing member | 51: lower mounting bracket |
| 55: upper mounting bracket | |
| 61: rear shock absorber upper reinforcing member | |
| 63: rear shock absorber mounting portion | |
| 65: connection member | |
| 100: rear vehicle body structure | |

DETAILED DESCRIPTION OF ILLUSTRATIVE EMBODIMENTS

The terminology used herein is for the purpose of describing specific exemplary embodiments and is not intended to limit the present invention. As used herein, the singular forms are also intended to include the plural forms, unless the context clearly dictates otherwise. As used herein, it should be understood that the terms 'include' and/or 'including' refer to the presence of specified features, integers, steps, operations, elements and/or components, but do not exclude the presence or addition of one or more other features, integers, steps, operations, components, and/or groups thereof. Furthermore, as used herein, the term 'and/or' includes any one or all combinations of one or more of the associated listed items. As used herein, the term 'coupled' denotes a physical relationship between two components directly connected to each other by welding, self piercing rivet (SPR), flow drill screw (FDS), structural adhesive, etc. or indirectly connected through one or more intervening components.

It is understood that the term "vehicle", "vehicular", "automobile", or other similar term as used herein may generally refer to passenger vehicles including sports cars, sport utility vehicles (SUVs), buses, trucks, passenger automobiles including various commercial vehicles, including hybrid vehicles, electric vehicles, hybrid electric vehicles, hydrogen-powered vehicles, purpose built vehicles (PBVs), and other alternative fuel vehicles (e.g., fuels derived from resources other than petroleum).

Hereinafter, exemplary embodiments of the present invention will be described in detail with reference to the accompanying drawings.

FIGS. 1 to 4 are perspective views illustrating a rear vehicle body structure according to an exemplary embodiment of the present invention.

Referring to FIGS. 1 to 4, a rear vehicle body structure 100 according to an exemplary embodiment of the present invention may be applied to vehicle bodies of electric vehicles, and furthermore, hydrogen electric vehicle-based passenger (e.g., sedan type, coupe type, sports car type, etc.) vehicles.

A vehicle body of the hydrogen electric vehicle-based passenger vehicle includes a vehicle body middle portion 1 configured to form a passenger compartment and a vehicle body rear portion 3 to which the rear vehicle body structure 100 according to an exemplary embodiment of the present invention is applied.

Various parts, such as a high-voltage battery 5, a fuel cell stack (not shown), a driving motor (not shown), an inverter (not shown), at least one hydrogen tank 7, and a cooling module 9 may be mounted in the hydrogen electric vehicle-based passenger vehicle.

In the rear vehicle body structure 100 according to an exemplary embodiment of the present invention, the cooling module 9 is mounted on both sides of the vehicle body rear portion 3 along the vehicle width direction. Here, since the cooling module 9 is disposed on both sides of the vehicle body rear portion 3, the cooling module 9 may also be referred to as a side cooling module.

The cooling module 9 is configured to cool at least one of a plurality of heat-generating parts (e.g., a battery, a fuel cell stack, a driving motor, an inverter, etc.) mounted on the vehicle body of the hydrogen electric vehicle-based passenger vehicle. The cooling module 9 may include a radiator and a cooling fan known to those skilled in the art.

In this specification, a 'vehicle front-rear direction' may be defined as a length direction of a vehicle body, a 'vehicle width direction' may be defined as a left-right direction of the vehicle body, and an 'up-down direction' may be defined as a height direction of the vehicle body.

Further, in the present specification, the term 'upper end portion', 'upper portion', 'upper end', or 'upper surface' of a component refers to an end portion, portion, end, or surface of the component that is relatively higher in the drawing, and 'lower end portion', 'lower portion', 'lower end', or 'lower surface' refers to an end portion, portion, end, or surface of a component that is relatively lower in the drawing.

Further, in the present specification, an end of a component (e.g., one end or the other end, etc.) refers to an end of the component in a certain direction, and an end portion (e.g., one end portion or the other end portion, etc.) of the component refers to a certain portion of the component including the end.

The rear vehicle body structure 100 according to an exemplary embodiment of the present invention has a structure of securing mount rigidity of the cooling module 9 and vehicle body rigidity of the vehicle body rear portion 3, while securing a space for mounting the cooling module 9 on both sides of the vehicle body rear portion 3 along the vehicle width direction.

Figure 2:
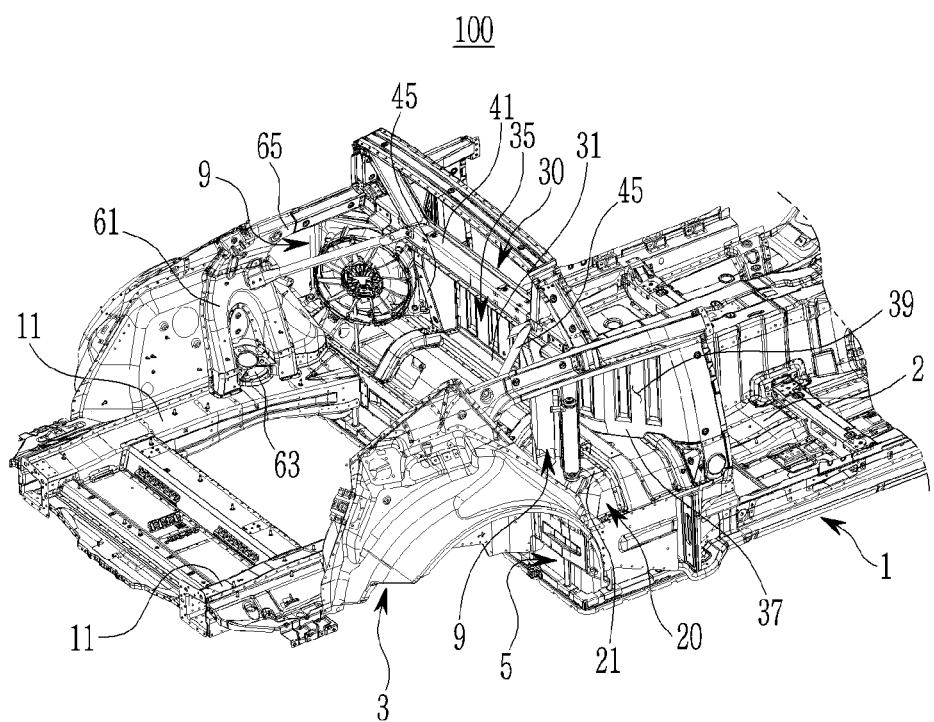
Figure 3:
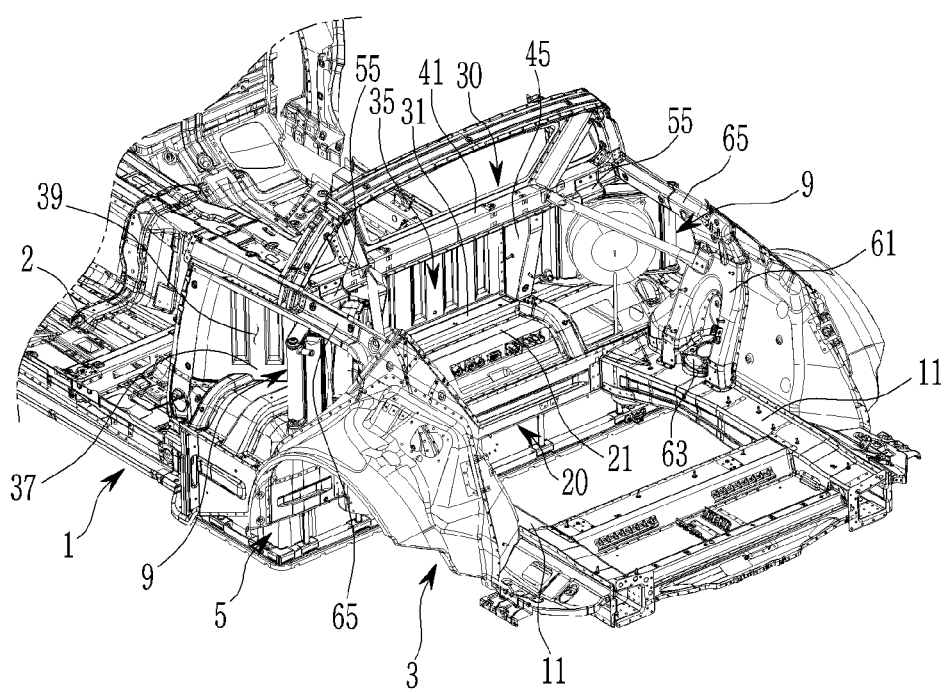
Figure 4:
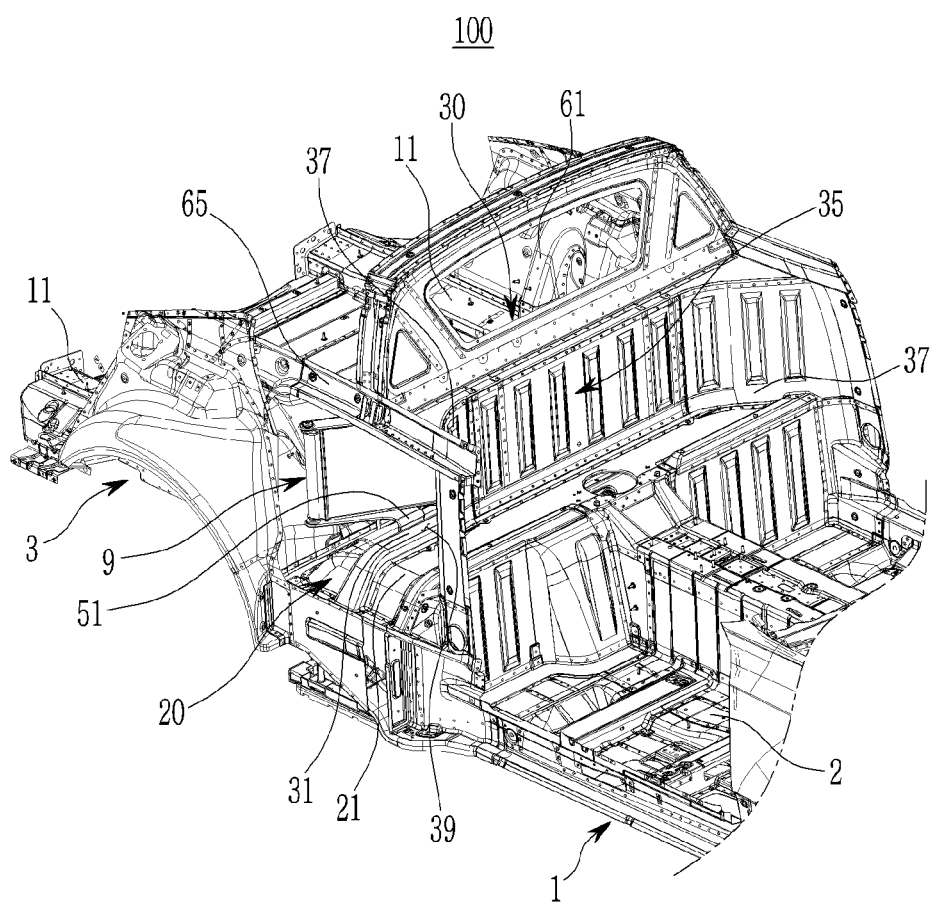
Figure 5:
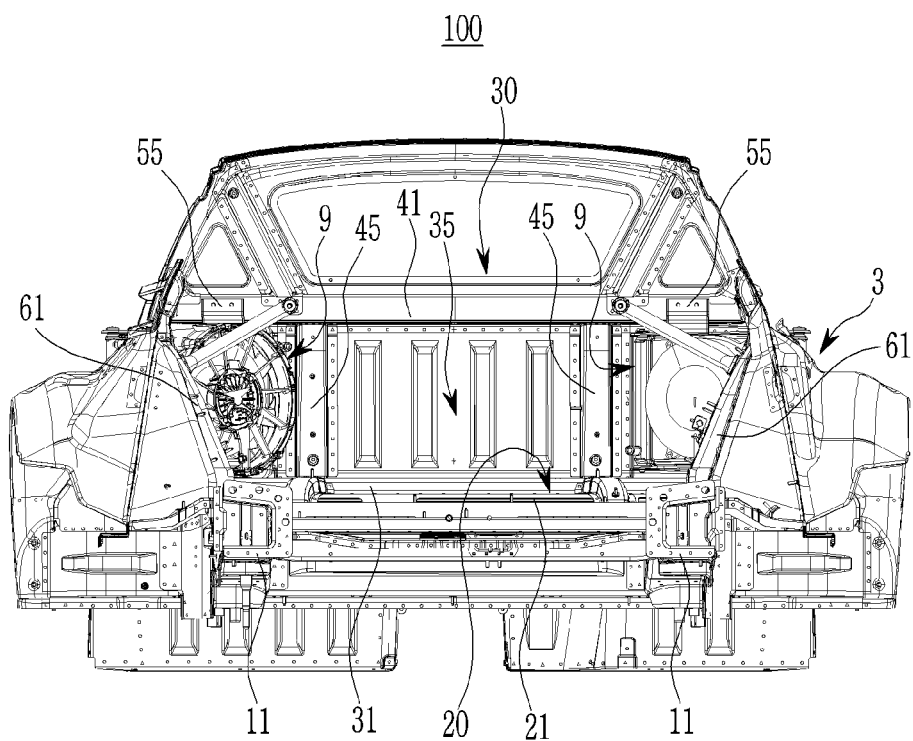
FIG. 5 is a front view of FIG. 2 illustrating a rear vehicle body structure according to an exemplary embodiment of the present invention.
Figure 6:
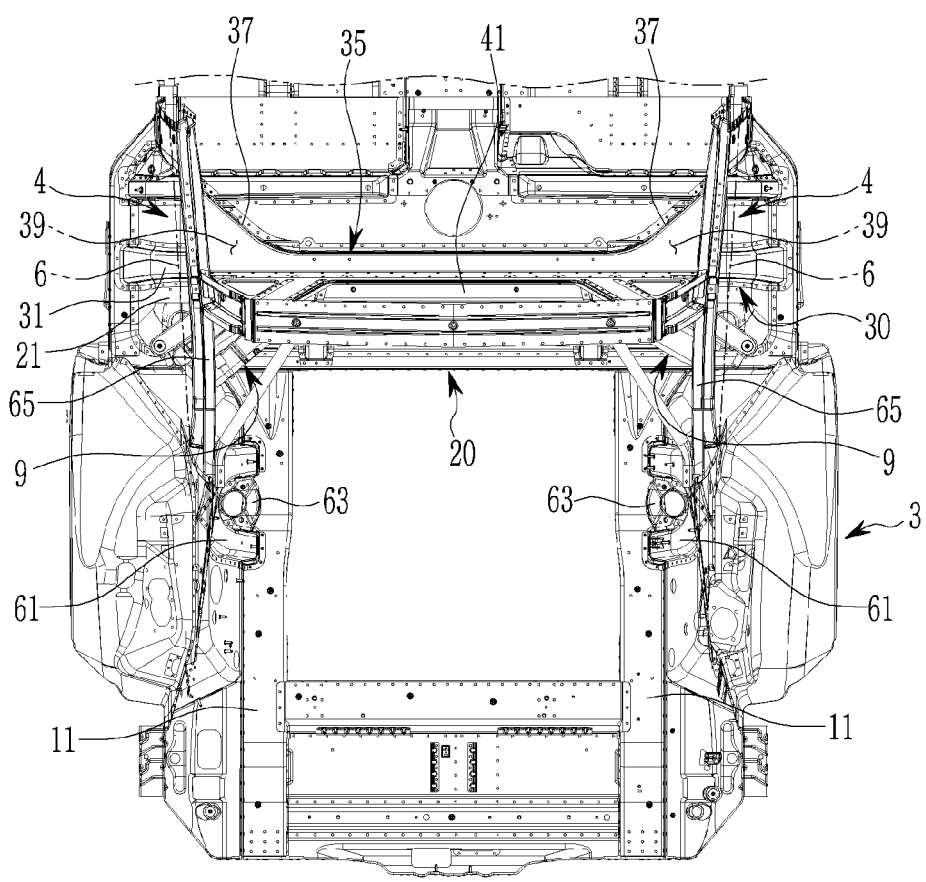
FIG. 6 is a plan view of FIG. 2 illustrating a rear vehicle body structure according to an exemplary embodiment of the present invention.
Figure 7:
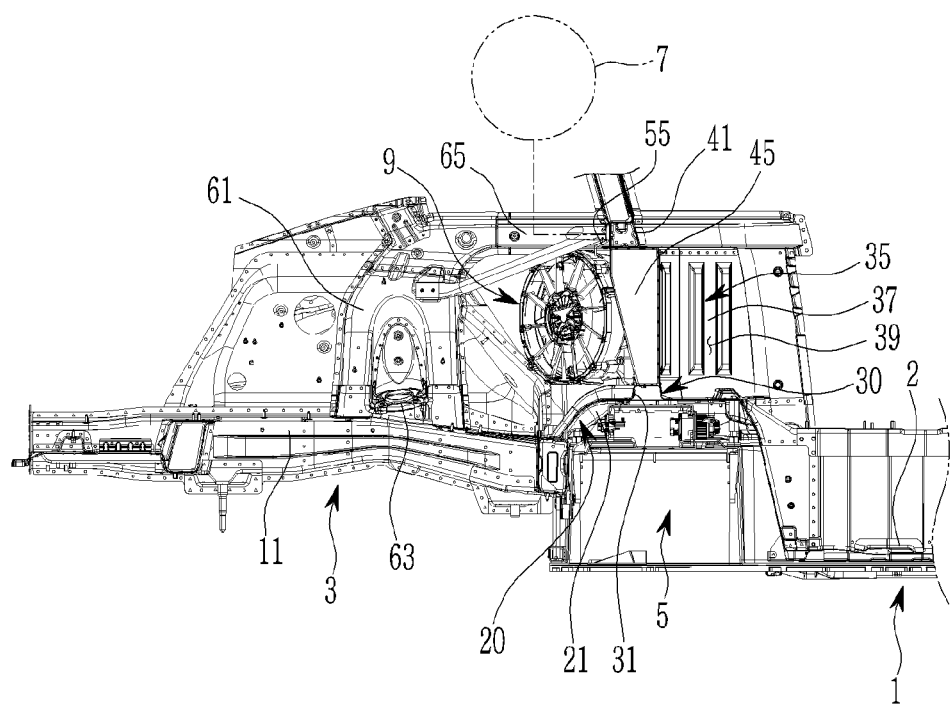
FIG. 7 is a side cross-sectional view of FIG. 2 illustrating a rear vehicle body structure according to an exemplary embodiment of the present invention.

FIG. 5 is a front view showing a rear vehicle body structure according to an exemplary embodiment of the present invention, FIG. 6 is a plan view of FIG. 2, showing a rear vehicle body structure according to an exemplary embodiment of the present invention, and FIG. 7 is a side cross-sectional view of FIG. 2, showing a rear vehicle body structure according to an exemplary embodiment.

Referring to FIGS. 1 to 7, the rear vehicle body structure 100 according to an exemplary embodiment of the present invention includes a rear side member 11, a rear floor structure 20, and a cooling module mounting unit 30.

In an exemplary embodiment of the present invention, the rear side member 11 is provided on both sides of the vehicle body rear portion 3 in the vehicle width direction, respectively, and is disposed along the front-rear direction of the vehicle body.

In an exemplary embodiment of the present invention, the rear floor structure 20 is disposed along the vehicle width direction at the vehicle body rear portion 3, and is coupled to a front portion of the rear side member 11. The rear floor structure 20 may be coupled to a rear portion of a center floor panel 2 provided in the vehicle body middle portion 1.

Here, the rear floor structure 20 includes a dome-shaped rear floor panel 21. The battery 5 as mentioned above may be disposed below the rear floor panel 21.

In an exemplary embodiment of the present invention, the cooling module mounting unit 30 is configured so that cooling modules 9 are respectively arranged on both sides of the rear floor structure 20 along the vehicle width direction. The cooling modules 9 may be respectively connected to both sides of the cooling module mounting unit 30 and may be substantially connected to the rear floor structure 20.

The cooling module mounting unit 30 includes a lower mounting cross member 31, a partition panel 35, an upper mounting cross member 41, at least one mounting reinforcing member 45, at least one lower mounting bracket 51, and at least one upper mounting bracket 55.

The lower mounting cross member 31 supports a lower portion of the cooling module 9, while reinforcing an upper portion of the rear floor structure 20. The lower mounting cross member 31 may be coupled to the upper portion of the rear floor structure 20 along the vehicle width direction and may be coupled to a lower portion of the cooling module 9.

The lower mounting cross member 31 may be coupled to an upper surface of the rear floor panel 21. In an example, a closed section having a rectangular cross-section may be formed between the lower mounting cross member 31 and the upper surface of the rear floor panel 21.

The partition panel 35 is configured to partition (or shield) each of the vehicle body middle portion 1 and the vehicle body rear portion 3. The partition panel 35 is coupled to a boundary point between the vehicle body middle portion 1 and the vehicle body rear portion 3. The partition panel 35 is disposed along the vehicle width direction at the boundary point between the vehicle body middle portion 1 and the vehicle body rear portion 3.

The partition panel 35 is coupled to an upper portion of the rear floor structure 20 in the up-down direction and is coupled to the lower mounting cross member 31. That is, a lower portion of the partition panel 35 may be coupled to an upper portion of the rear floor panel 21 and the lower mounting cross member 31.

The upper mounting cross member 41 supports the lower portion of the cooling module 9, while reinforcing the upper portion of the partition panel 35. The upper mounting cross member 41 may be coupled to the upper portion of the partition panel 35 along the vehicle width direction and may be coupled to the upper portion of the cooling module 9.

Both end portions of the upper mounting cross member 41 may be coupled to the rear side panel 6 of the side structures 4 provided on both sides of the vehicle body rear portion 3 in the vehicle width direction. In addition, the upper mounting cross member 41 may be coupled to an upper surface of the partition panel 35. In an example, a closed section having a rectangular cross-section may be formed between the upper mounting cross member 41 and the upper surface of the partition panel 35.

Here, the partition panel 35 includes a bent portion 37 bent toward the vehicle body middle portion 1 from both sides along the vehicle width direction. An air flow passage 39 connected to the cooling module 9 is formed between the bent portion 37 and the rear side panel 6.

Further, an air inlet hole 8 connected to the air flow passage 39 is formed at the rear side panel 6. Accordingly, when the cooling module 9 operates, external air may be introduced into the cooling module 9, while flowing along the air flow passage 39 through the air inlet hole 8.

Furthermore, at least one hydrogen tank 7 may be mounted on the upper mounting cross member 41 as described above. The upper mounting cross member 41 may support at least one hydrogen tank 7 through a mounting unit (e.g., a mounting bracket, etc.) known to those skilled in the art.

The at least one mounting reinforcing member 45 is configured to reinforce the lower mounting cross member 31, the upper mounting cross member 41, and the partition panel 35. The at least one mounting reinforcing member 45 is coupled to the lower mounting cross member 31, the upper mounting cross member 41, and the partition panel 35 in an up-down vertical direction.

The at least one mounting reinforcing member 45 may be coupled to a rear surface of the partition panel 35. In an example, a closed section having a rectangular cross-section may be formed between the at least one mounting reinforcing member 45 and the rear surface of the partition panel 35.

Figure 8:
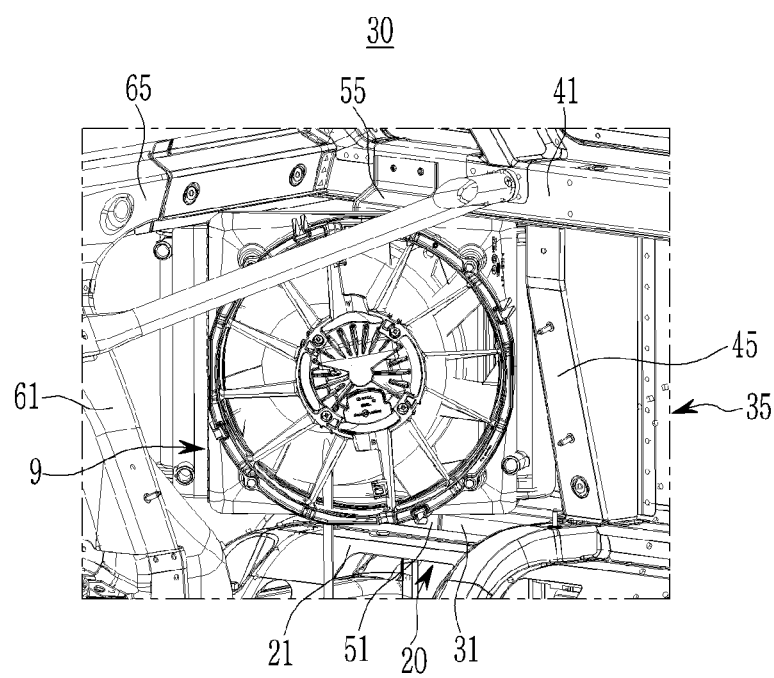
FIG. 8 is a view illustrating a lower mounting bracket and an upper mounting bracket applied to a rear vehicle body structure according to an exemplary embodiment of the present invention.

As shown in FIG. 8, the at least one lower mounting bracket 51 is configured to fix (e.g., mount) the lower portion of the cooling module 9 to the lower mounting cross member 31. The at least one lower mounting bracket 51 is coupled to the lower portion of the cooling module 9 and the lower mounting cross member 31.

Also, as shown in FIG. 8, the at least one upper mounting bracket 55 is configured to fix (e.g., mount) the upper portion of the cooling module 9 to the upper mounting cross member 41. The at least one upper mounting bracket 55 is coupled to the upper portion of the cooling module 9 and the upper mounting cross member 41.

Meanwhile, the rear vehicle body structure 100 according to an exemplary embodiment of the present invention further includes a rear shock absorber upper reinforcing member 61. The rear shock absorber upper reinforcing member 61 is configured to reinforce the rear shock absorber mounting portion 63 coupled to the rear side member 11. The rear shock absorber mounting portion 63 is configured to mount a rear shock absorber of a rear suspension known to those skilled in the art.

The rear shock absorber upper reinforcing member 61 may be disposed along the vertical direction, coupled to the rear side member 11, and coupled to the side structure 4.

Here, the upper portion of the rear shock absorber upper reinforcing member 61 may be coupled to the upper mounting cross member 41 of the vehicle body along the front-rear direction through the connecting member 65.

Hereinafter, an operation of the rear vehicle body structure 100 according to an exemplary embodiment of the present invention configured as described above will be described in detail with reference to FIGS. 1 to 8.

First, in the vehicle body rear portion 3, the rear floor structure 20 is coupled to a front portion of the rear side member 11 and a rear portion of the center floor panel 2 of the vehicle body middle portion 1. In addition, the cooling module mounting unit 30 is coupled to the rear floor structure 20.

Here, the lower mounting cross member 31 of the cooling module mounting unit 30 is coupled to the upper portion of the rear floor structure 20. The partition panel 35 of the cooling module mounting unit 30 is coupled to an upper portion of the rear floor structure 20 and the lower mounting cross member 31. The upper mounting cross member 41 of the cooling module mounting unit 30 is coupled to an upper portion of the partition panel 35. At least one mounting reinforcing member 45 of the cooling module mounting unit 30 is coupled to the lower mounting cross member 31, the partition panel 35, and the upper mounting cross member 41.

Further, the rear shock absorber upper reinforcing member 61 is coupled to the rear side member 11. The upper portion of the rear shock absorber upper reinforcing member 61 is coupled to the upper mounting cross member 41 along the front-rear direction of the vehicle body through the connecting member 65.

Furthermore, at least one lower mounting bracket 51 of the cooling module mounting unit 30 is coupled to the lower mounting cross member 31 on both sides of the rear floor structure 20 in the vehicle width direction. In addition, at least one upper mounting bracket 55 of the cooling module mounting unit 30 is coupled to the upper mounting cross member 41.

Then, a lower portion of the cooling module 9 is coupled to at least one lower mounting bracket 51, and an upper portion of the cooling module 9 is coupled to at least one upper mounting bracket 55.

Accordingly, the cooling module 9 may be disposed in spaces respectively provided on both sides of the rear floor structure 20 in the vehicle width direction.

Here, an air flow passage 39 is formed between the bent portion 37 of the partition panel 35 and the rear side panel 6, and the air flow passage 39 is connected to the air inlet hole 8 of the rear side panel 6.

In the rear vehicle body structure 100 according to an exemplary embodiment of the present invention as described so far, the cooling module 9, which may not be additionally mounted due to a limited space at a vehicle body front portion, may be installed on both sides of the rear floor structure 20 along the vehicle width direction.

Accordingly, the rear vehicle body structure 100 according to an exemplary embodiment of the present invention may further improve the cooling performance of heat-generating components mounted in the hydrogen electric vehicle-based passenger vehicle.

Meanwhile, as at least one lower mounting bracket 51 is coupled to the lower mounting cross member 31 and at least one upper mounting bracket 55 is coupled to the upper mounting cross member 41, the cooling module 9 may be connected along the vehicle width direction through the lower mounting cross member 31 and the upper mounting cross member 41.

In addition, as the rear shock absorber upper reinforcing member 61 is coupled to the upper mounting cross member 41 through the connecting member 65, the cooling module 9 may be connected through the rear shock absorber upper reinforcing member 61, the connecting member 65, and the upper mounting cross member 41 along the front-rear direction of the vehicle body.

Further, as the lower mounting cross member 31, the upper mounting cross member 41, and the at least one mounting reinforcing member 45 are coupled to the partition panel 35, the cooling module 9 may be connected in the up-down direction through the lower mounting cross member 31, the upper mounting cross member 41, and the at least one mounting reinforcing member 45.

Accordingly, in the rear vehicle body structure 100 according to an exemplary embodiment of the present invention, since the cooling module 9 is connected in the front-rear direction, the vehicle width direction, and the up-down direction of the vehicle body, the vehicle body connectivity of the cooling module 9 may be strengthened and, at the same time, mounting rigidity may be secured, and the vehicle body robustness of the vehicle body rear portion 3 may be secured.

While this invention has been described in connection with what is presently considered to be practical exemplary embodiments, it is to be understood that the invention is not limited to the disclosed exemplary embodiments. On the contrary, it is intended to cover various modifications and equivalent arrangements included within the spirit and scope of the appended claims.

What is claimed is:

1. A rear vehicle body structure comprising:
   a rear floor structure coupled to rear side members respectively arranged on both sides of a vehicle body rear portion along a vehicle width direction; and
   a cooling module mounting unit comprising:
   cooling modules respectively connected to both sides of the vehicle body rear portion, wherein the cooling modules are respectively arranged on both sides of the rear floor structure along the vehicle width direction;
   a lower mounting cross member coupled to an upper portion of the rear floor structure along the vehicle width direction and coupled to lower portions of the cooling modules;

a partition panel vertically coupled to the lower mounting cross member to partition a vehicle body middle portion and the vehicle body rear portion; and an upper mounting cross member coupled to an upper portion of the partition panel along the vehicle width direction and coupled to upper portions of the cooling modules.

2. The rear vehicle body structure of claim 1, wherein the rear floor structure is coupled to a center floor panel provided in the vehicle body middle portion and a front portion of the rear side members.

3. The rear vehicle body structure of claim 1, wherein the cooling module mounting unit further comprises:
at least one lower mounting bracket coupled to the lower portions of the cooling modules and the lower mounting cross member; and
at least one upper mounting bracket coupled to the upper portions of the cooling modules and the upper mounting cross member.

4. The rear vehicle body structure of claim 1, wherein the partition panel comprises a bent portion bent from both sides along the vehicle width direction to the vehicle body middle portion.

5. The rear vehicle body structure of claim 4, further comprising rear side panels respectively provided on both sides of the vehicle body rear portion along the vehicle width direction, wherein an air flow passage connected to the cooling modules is defined between the bent portion and the rear side panels.

6. The rear vehicle body structure of claim 5, further comprising an air inlet hole in the rear side panels, the air inlet hole being connected to the air flow passage.

7. The rear vehicle body structure of claim 1, wherein the cooling module mounting unit further comprises a mounting reinforcing member coupled to the lower mounting cross member, the upper mounting cross member, and the partition panel in an up-down vertical direction.

8. The rear vehicle body structure of claim 1, further comprising a rear shock absorber upper reinforcing member coupled to the rear side members.

9. The rear vehicle body structure of claim 8, further comprising a connecting member, wherein an upper portion of the rear shock absorber upper reinforcing member is coupled to the upper mounting cross member along a vehicle front-rear direction through the connecting member.

10. The rear vehicle body structure of claim 1, wherein the rear floor structure comprises a dome-shaped rear floor panel coupled to a lower portion of the partition panel and the lower mounting cross member.

11. The rear vehicle body structure of claim 10, further comprising a battery disposed below the rear floor panel.

12. The rear vehicle body structure of claim 1, further comprising a hydrogen tank mounted on the upper mounting cross member.

13. A vehicle comprising:
a vehicle body comprising a vehicle body middle portion and a vehicle body rear portion;
a center floor panel provided in the vehicle body middle portion;
rear side members respectively arranged on both sides of the vehicle body rear portion along a vehicle width direction;
a rear floor structure coupled to the center floor panel and to a front portion of the rear side members, the rear floor structure comprising a rear floor panel;
a cooling module mounting unit comprising:
cooling modules respectively arranged on both sides of the rear floor structure along the vehicle width direction;
a lower mounting cross member coupled to an upper portion of the rear floor structure along the vehicle width direction and coupled to lower portions of the cooling modules;
a partition panel vertically coupled to the lower mounting cross member to partition the vehicle body middle portion and the vehicle body rear portion, wherein the rear floor panel is coupled to a lower portion of the partition panel and the lower mounting cross member; and
an upper mounting cross member coupled to an upper portion of the partition panel along the vehicle width direction and coupled to upper portions of the cooling modules; and
a battery disposed below the rear floor panel.

14. The vehicle of claim 13, wherein the cooling module mounting unit further comprises:
at least one lower mounting bracket coupled to the lower portions of the cooling modules and the lower mounting cross member; and
at least one upper mounting bracket coupled to the upper portions of the cooling modules and the upper mounting cross member.

15. The vehicle of claim 13, wherein the partition panel comprises a bent portion bent from both sides along the vehicle width direction to the vehicle body middle portion.

16. The vehicle of claim 15, further comprising:
rear side panels respectively provided on both sides of the vehicle body rear portion along the vehicle width direction;
wherein an air flow passage connected to the cooling modules is defined between the bent portion and the rear side panels; and
wherein an air inlet hole provided in the rear side panels is connected to the air flow passage.

17. The vehicle of claim 13, wherein the cooling module mounting unit further comprises a mounting reinforcing member coupled to the lower mounting cross member, the upper mounting cross member, and the partition panel in an up-down vertical direction.

18. The vehicle of claim 13, further comprising:
a rear shock absorber upper reinforcing member coupled to the rear side members; and
a connecting member, wherein an upper portion of the rear shock absorber upper reinforcing member is coupled to the upper mounting cross member along a vehicle front-rear direction through the connecting member.

19. The vehicle of claim 13, wherein the rear floor structure comprises a dome-shaped rear floor panel coupled to the lower portion of the partition panel and the lower mounting cross member.

20. The vehicle of claim 13, further comprising a hydrogen tank mounted on the upper mounting cross member.

* * * * *